United States Patent [19]

Smith

[11] 4,217,738
[45] Aug. 19, 1980

[54] WINDMILL TOWER

[76] Inventor: Paul R. Smith, P.O. Box 563, Deming, N. Mex. 88030

[21] Appl. No.: 930,145

[22] Filed: Aug. 2, 1978

[51] Int. Cl.² ............... E04H 12/18; F04B 17/00
[52] U.S. Cl. ............................. 52/40; 52/295; 52/296; 416/DIG. 4; 417/336
[58] Field of Search .............. 52/40, 295, 296; 417/334–336; 416/DIG. 4

[56] References Cited

U.S. PATENT DOCUMENTS

| 3,311,333 | 3/1967 | Galloway | 52/295 |
| 3,561,890 | 2/1971 | Peterson | 417/336 |
| 3,671,738 | 6/1972 | Beachley | 52/296 X |

FOREIGN PATENT DOCUMENTS 875140  6/1953  Fed. Rep. of Germany ........... 417/336

Primary Examiner—Ernest R. Purser
Attorney, Agent, or Firm—Bacon & Thomas

[57] ABSTRACT

A tower is hinged to a base, positioned at one side of a well, so the tower can be lowered to the ground in a direction away from the well. A lateral platform at the top of the tower extends over the well and the tower is rotatable, about a vertical axis, to swing the platform laterally and clear of the space over the well.

3 Claims, 8 Drawing Figures

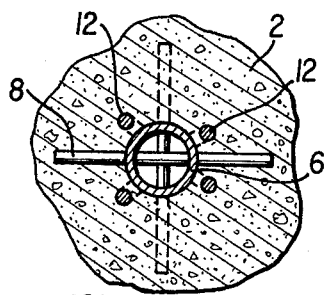
FIG.4
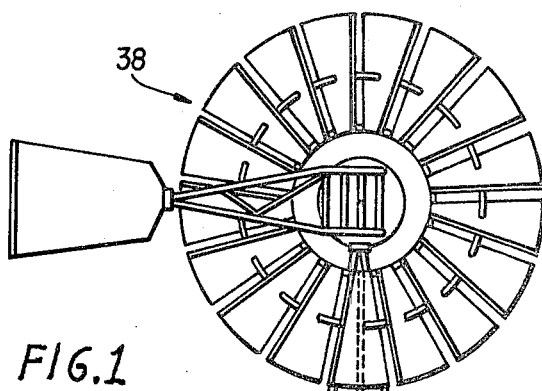
FIG.1
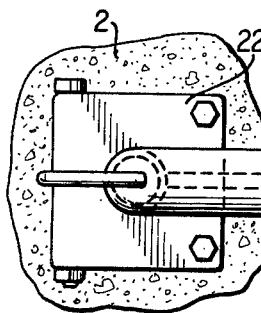
FIG.2
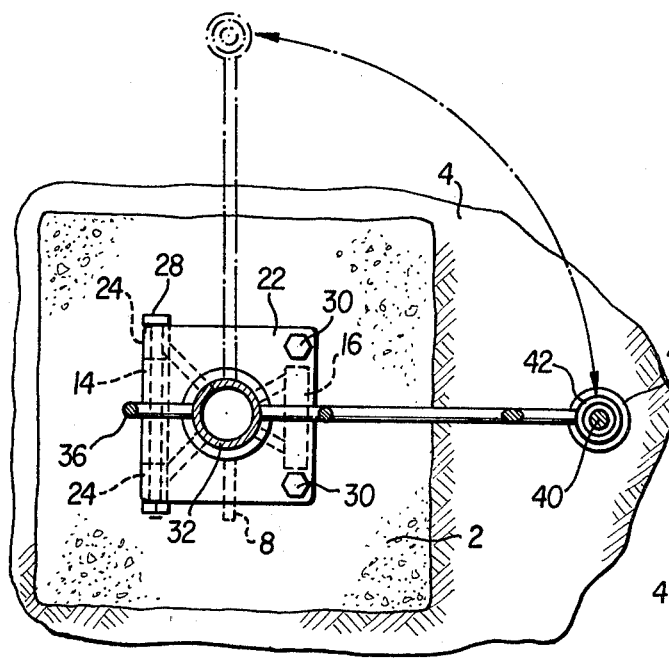
FIG.3
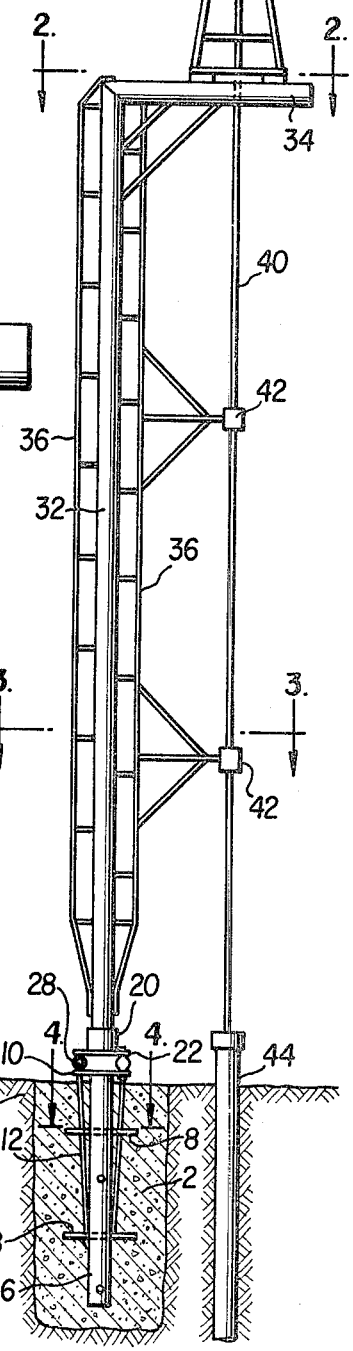

WINDMILL TOWER

BACKGROUND OF THE INVENTION

This invention is in the field of towers and particularly windmill towers or the like.

Towers erected over wells for forming, operating or servicing the same have conventionally been rigid immovable structures rendering the servicing of mechanisms at the top of the tower extremely difficult and limiting the apparatus or steps that could be employed in servicing the well itself. It has been proposed to construct such towers to be tilted to bring the elevated mechanism to ground level for servicing, such as shown in the Perry U.S. Pat. Nos. 485,883 and 717,916. However, that proposal involved a stationary tower with an extension pivoted to the top which could be swung downwardly to about ground level. However, the tower itself remains in obstructing position over the well head. The patent to Beachley shows a standard or pole for a light, which pole is hinged at ground level and capable of being swung downwardly for servicing the lamp or lamp fixture at the top of the standard. The Beachley patent, of course, is not a tower related to a well and teaches nothing of utility in that regard. The Perry patents which do permit servicing the elevated mechanisms do not, however, permit ready access to the well itself when service therein is necessary, and these patents also involve rather complicated and expensive structures.

SUMMARY OF THE INVENTION

The present invention solves the problems noted above and provides a windmill or the like tower erected, not over but adjacent a well extending into the ground. The tower can be tilted at its base to lie horizontal and thus provide ready access to any mechanism mounted at the upper end thereof and at the same time remove all obstructions from over the well, rendering the latter readily accessible. In addition, the tower is capable of pivotal movement around a vertical axis positioned laterally of the well so that the tower and all mechanisms carried thereby may be swung to a position clear of the upward projection of the well and thus render the well accessible for service without the necessity of lowering the tower to the ground.

BRIEF DESCRIPTION OF THE DRAWINGS

FIG. 1 is a side elevational view of the windmill tower of the present invention;

FIG. 2 is an enlarged fragmentary plan view of the tower of FIG. 1, taken on the line 2—2 thereof;

FIG. 3 is a horizontal sectional view, taken on the line 3—3 of FIG. 1;

FIG. 4 is a fragmentary horizontal sectional view, taken on the line 4—4 of FIG. 1;

DESCRIPTION OF A PREFERRED EMBODIMENT

Figure 5:
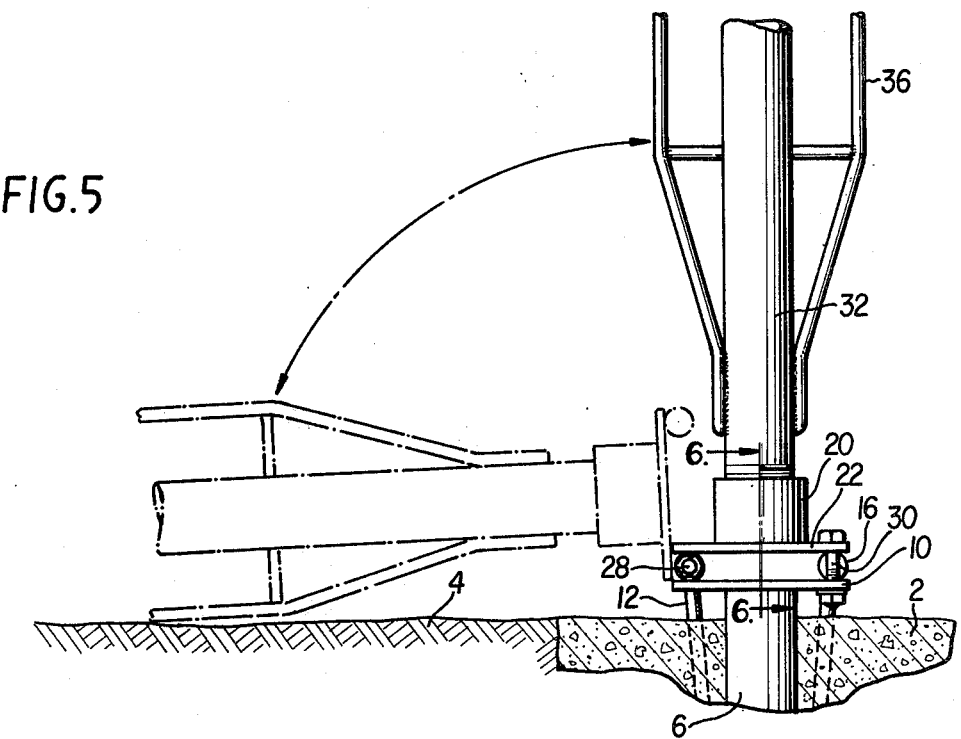
FIG. 5 is an enlarged fragmentary elevational view, partly in section, of the hinged footing of the tower.
Figure 8:
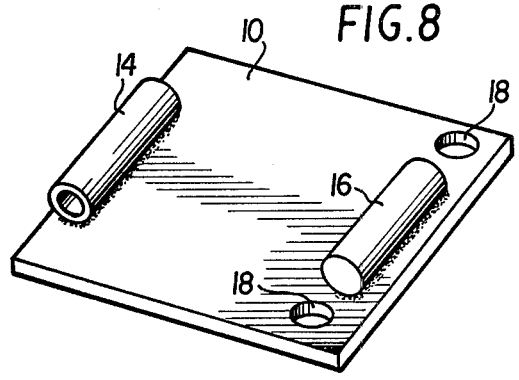
FIG. 8 is a perspective view of the top surface of the lower hinge plate.

Referring to the drawings and first to FIG. 1 particularly, there is shown a suitable concrete footing 2 embedded in the ground 4 and in which a base member 6 is embedded having laterally extending elements 8 to firmly anchor the base in the concrete. At this upper end adjacent ground level, the base member 6 is provided with a horizontal plate 10 (see also FIG. 6) rigidly secured thereto by welding or the like and reinforced by the illustrated brace members 12. The plate 10 is shown in greater detail in FIG. 8 and has a hollow cylindrical bushing or bearing member 14 secured to its upper surface adjacent one edge, the bushing being of less length than the adjacent edge of the plate 10. Adjacent its opposite edge the plate 10 is provided with a rod or abutment 16 welded thereto and being of a height substantially equal to the outer diameter of the bushing 14. Openings 18 are formed in the plate 10 adjacent the ends of the abutment 16. A tower fitting 20 in the form of an internally threaded socket is welded or otherwise rigidly secured to an upper plate 28, the lower side of which is shown in FIG. 7. On its lower surface the upper plate 22 is provided with spaced aligned hollow cylindrical bushings 24, spaced apart a distance substantially equal to the length of the bushing 14 previously referred to. The plate 22 is also provided with openings 26 adjacent the corners opposite the bushings 24. It is to be understood that the plate as shown in FIG. 7 is inverted in use, as clearly shown in FIGS. 1, 5 and 6. In the positions shown in FIGS. 5 and 6, the bushings 24 are at the opposite ends of bushing 14 and aligned therewith. A suitable pivot pin 28 (FIG. 5) extends through the bushings and thus holds the plate 22 in hinged relation to the plate 10, the abutment 16 serving to maintain plate 22 in horizontal position. Bolts 30 extending through holes 18 and 26 hold the upper plate firmly against the abutment 16 and thus rigidly connect plate 22 to plate 10. The bolts 30, however, may be released to permit the plate 22 to pivot about pivot pin 28, as will be further described.

Figure 6:
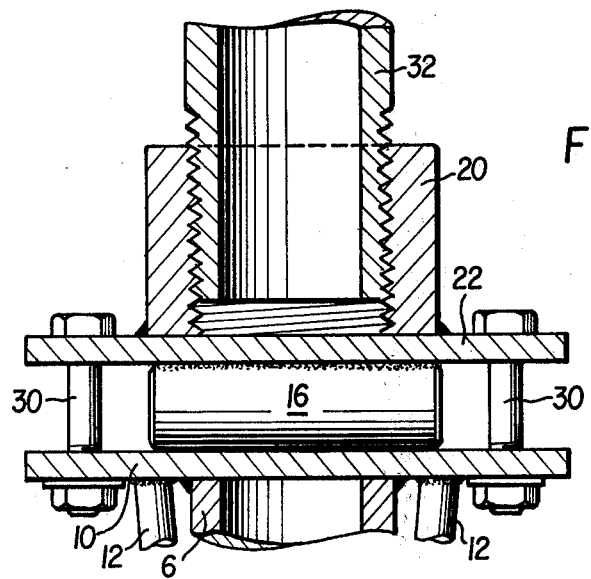
FIG. 6 is an enlarged fragmentary vertical sectional view, taken on the line 6—6 of FIG. 5.
Figure 7:
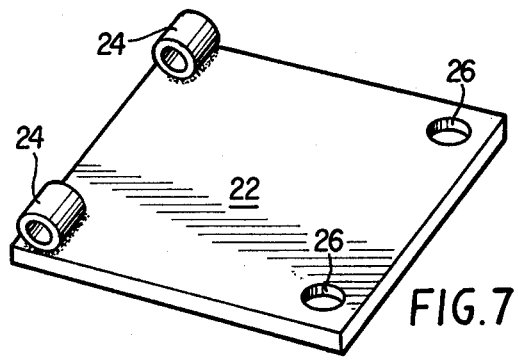
FIG. 7 is a perspective view of the upper surface of the upper hinge plate.

A tubular tower 32 of suitable length is provided with external threads at its lower end and is threadedly engaged in the socket 20, as clearly shown in FIG. 6. When the plate 22 is bolted to plate 10, as shown, the tower 32 extends vertically upwardly and is preferably provided with a laterally and horizontally extending platform 34 of any suitable form rigidly fixed to its upper end. The tower 32 may also be provided with external bracing trusses 36, as shown. Mounted on the platform 34 may be any suitable mechanism such as the windmill 38, although it is to be understood that well drilling apparatus, pumping means or the like may be mounted on the platform. As shown, the windmill 38 operates a vertically reciprocable rod 40 extending downwardly into a well 42 positioned adjacent but laterally of the base member 6 and tower 32. Preferably, suitable guide bushings 42 are mounted on the tower 32 to guide the rod 40 in its reciprocating motion. While not shown in the drawings, it is contemplated that the rod 40 will be provided with a separable joint adjacent the surface of the ground whereby it may be disconnected from the pump or other mechanism in the well 42.

In operation, the mechanism mounted on platform 34 can perform its intended functions in well 42 since it will be positioned directly thereover. In the event servicing within the well itself becomes necessary, the rod 40 can be disconnected as suggested previously, whereupon the tower 32 may be rotated about its vertical axis by partially screwing or unscrewing the same in socket 20. Thus, the platform 34 and guide bushing 42 may be swung laterally and any necessary equipment may then be used to withdraw the disconnected mechanism from the well or perform some other servicing operations in well 42.

FIG. 3 illustrates in dotted line a lateral position to which the bushings 42 and related structure may be swung in the manner just described.

In the event servicing of the windmill 38 itself or other mechanism mounted on platform 34 becomes necessary, the tower may be lowered to bring the platform 34 close to the surface of the ground to provide ready accessibility to the windmill or the like. This is accomplished by removing bolts 30 whereupon the tower 32 and upper plate 22 may be pivotally lowered around the axis of pivot pin 28 to or near the position shown by dotted lines in FIG. 5 and the ready accessibility of the platform is readily apparent.

The hinged base structure is preferably arranged so that pivot pin 28 is on that side of the structure remote from the well 42 whereby the tower is swung in a vertical plane and away from the upper projection of the well 42 to simultaneously leave the well head completely free of obstructions if servicing becomes necessary at the time.

While a single specific embodiment of the invention has been shown and described, the same is merely illustrative of the principles involved and other forms may be restored to within the scope of the appended claims.

I claim:

1. A windmill tower comprising:
   a base member having means for anchoring the same in the ground laterally adjacent a well;
   an elongated upright tower member on said base member and having a support platform fixed at its upper end extending laterally therefrom to a position over said well, said tower comprising a tubular member having external bracing trusses extending longitudinally thereof;
   hinge means mounting said tower to said base member for pivotal movement about a horizontal axis whereby said tower may be pivotally lowered, in a direction away from said well, to a horizontal position adjacent the ground including means for locking said tower in said upright position; and
   mounting means securing said tower to said hinge means for relative rotation about the longitudinal axis of said tower whereby said tower may be rotated, while in said upright position, to swing said support platform away from a position over said well.

2. A tower as defined in claim 1 wherein said tower comprises a cylindrical tubular member externally threaded at its bottom end, said mounting means comprising an internally threaded socket member threadedly receiving the bottom end of said tower.

3. A tower as defined in claim 1 including guide means extending laterally from said tower in position to guide a movable member from said tower to said well.

* * * * *